INVENTOR.
Thomas O. Mehan
BY Hinkle, Horton, Ahlberg, Hansmann & Wupper
Attorneys.

April 24, 1951     T. O. MEHAN     2,550,581
CREDIT BALANCE MECHANISM FOR CALCULATING MACHINES
Filed April 22, 1948     7 Sheets-Sheet 4

INVENTOR.
Thomas O. Mehan
BY
Hinkle, Horton, Ahlberg, Hausmann & Kupper
Attorneys.

April 24, 1951        T. O. MEHAN        2,550,581

CREDIT BALANCE MECHANISM FOR CALCULATING MACHINES

Filed April 22, 1948        7 Sheets-Sheet 6

INVENTOR.
Thomas O. Mehan
BY
Hinkle, Horton, Ahlberg, Hansmann & Kupper
Attorneys.

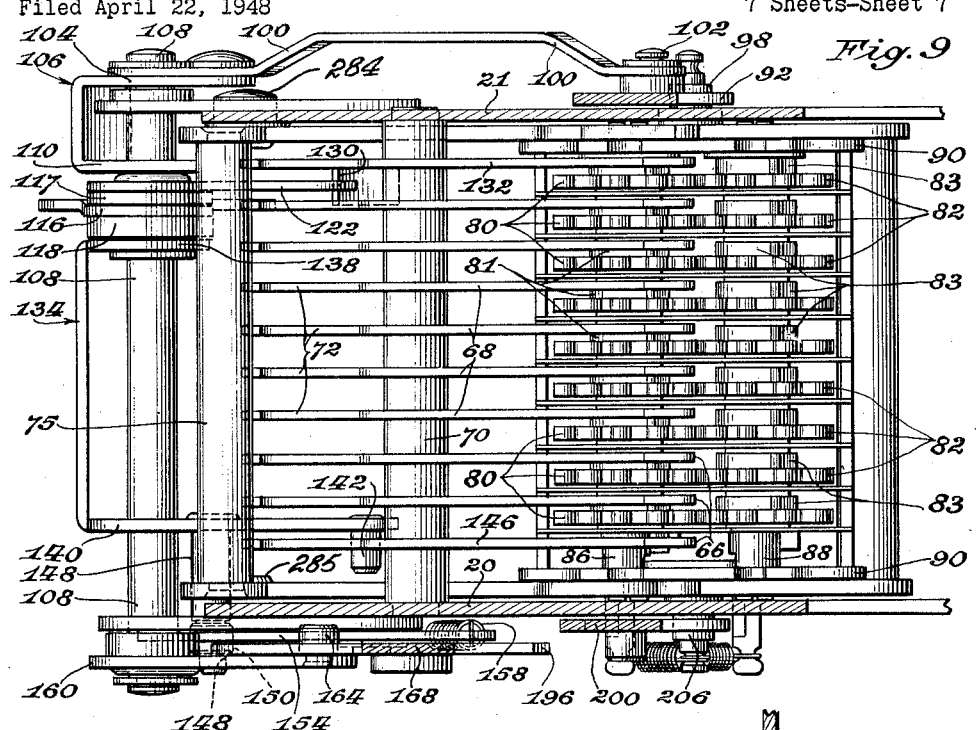
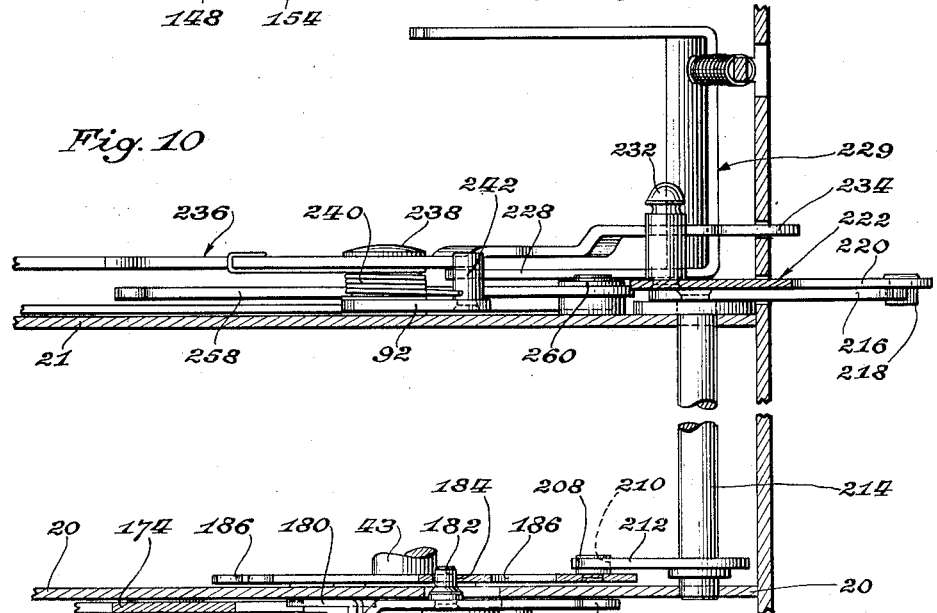

Patented Apr. 24, 1951

2,550,581

UNITED STATES PATENT OFFICE 2,550,581

CREDIT BALANCE MECHANISM FOR CALCULATING MACHINES

Thomas O. Mehan, Park Ridge, Ill., assignor to Victor Adding Machine Co., Chicago, Ill., a corporation of Illinois Application April 22, 1948, Serial No. 22,526

5 Claims. (Cl. 235—60.2)

My invention relates generally to adding and calculating machines, and more particularly to credit balance or overdraft mechanisms for machines of this type.

As is well known in the art, calculating machines provided with subtract mechanisms are subject to erroneous operation when the total appearing in the accumulator in the machine is negative, unless some means is provided to add into the accumulator the so called "fugitive 1." Furthermore, it is desirable in such machines to indicate in one way or another that an overdraft has taken place, or in other words, that the machine contains a negative total. In machines provided with printing mechanism, this is customarily accomplished by printing a credit balance signal, such as C or Cr adjacent the subtotal or total.

In order that this entry of the fugitive 1 is in the units pinion of the accumulator may be effected rapidly, as is required if the machine is of the type which does not require a blank stroke to recondition the transfer mechanism for operation, it is very desirable that the energy necessary for effecting the entry of the fugitive 1 be stored up and thus be readily available to effect such rapid operation.

It is therefore a primary object of the invention to provide an improved mechanism whereby the energy may be stored up for the rapid entry of the fugitive 1, and for the operation of the signal printing mechanism and associated parts.

A further object is to provide an improved mechanism for the entry of the fugitive 1, which is simple in construction, is reliable in operation, which may be readily used as an improvement on adding machines of well known construction, and which may be economically manufactured.

Other objects will appear from the following description, reference being had to the accompanying drawings, in which:

Fig. 2a is a fragmentary sectional view, taken on the line 2a—2a of Fig. 1;

Figure 1:
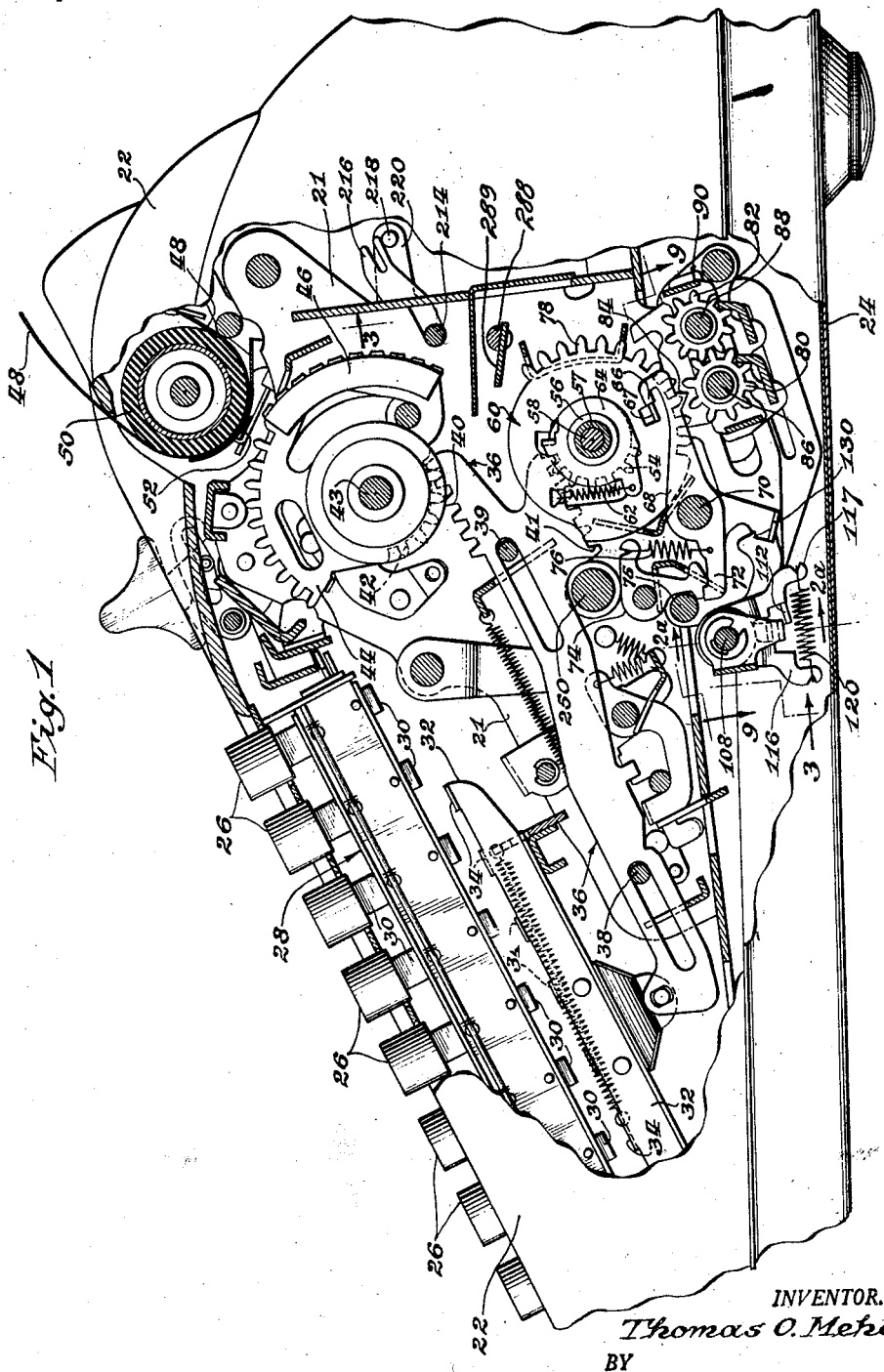
Fig. 1 is a right side elevational view, with the portions of the case and outer frame removed to show parts of the operating mechanism.
Figure 3:
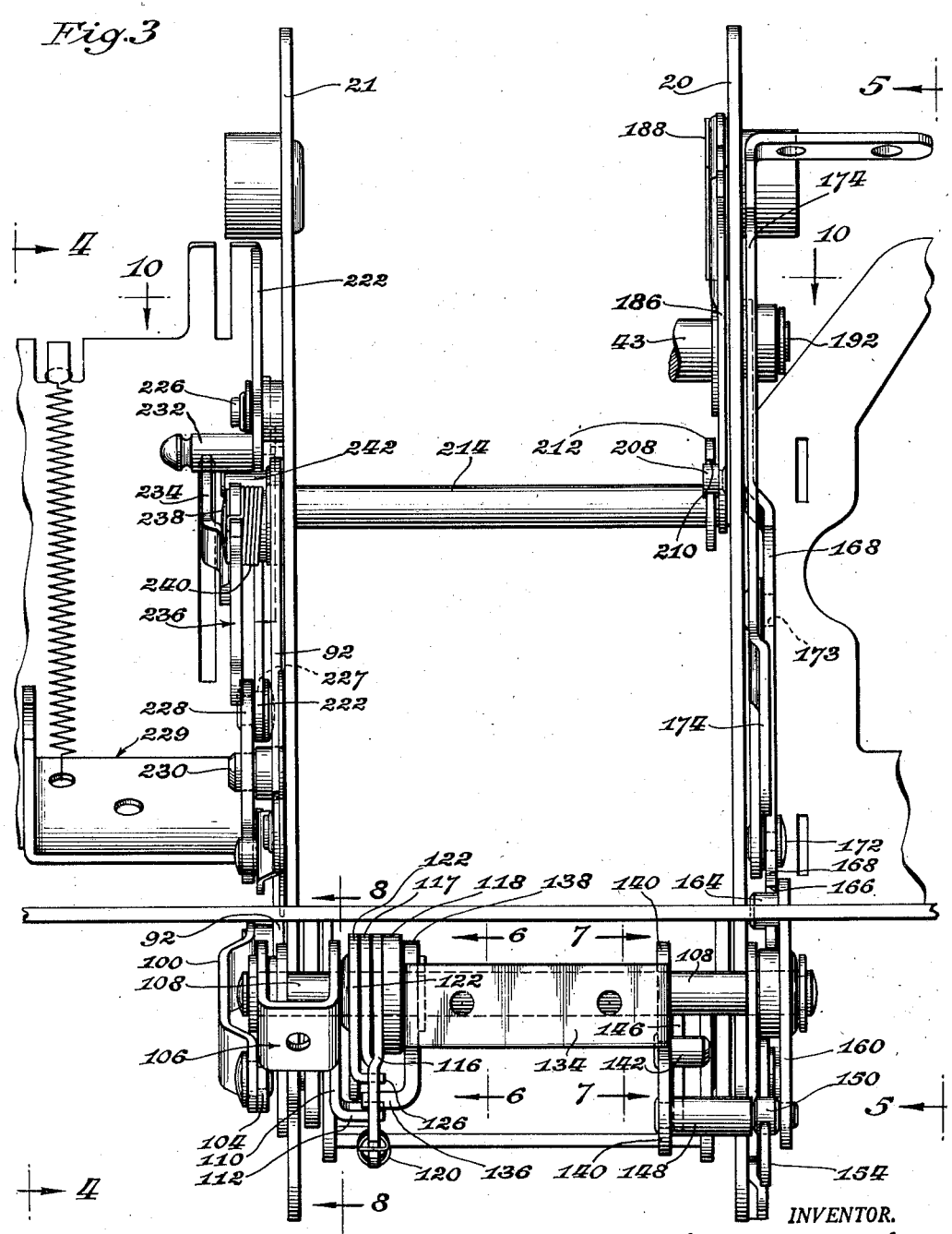
Fig. 3 is a generally vertical sectional view, taken along the broken sectional line 3—3 of Fig. 1, with portions of the mechanism omitted.

Fig. 9 is a fragmentary sectional view, taken along the broken line 9—9 of Fig. 1; showing the accumulators and the fugitive 1 entering mechanism; and Fig. 10 is a fragmentary sectional view, taken along the line 10—10 of Fig. 3, with many parts omitted.

General description

Referring particularly to Figs. 1 and 3, the machine comprises a plurality of frame plates including the accumulator mechanism supporting frame plates 20 and 21 (Fig. 3), the frame plates and most of the mechanism being enclosed in a suitable case 22 which is mounted on a felt lined base 24. The case is provided with a suitable aperture through which the numeral keys 26 forming parts of a keyboard assembly 28 project. While the machine herein disclosed is of the full keyboard type, this is merely for purposes of illustration, since the invention may as well be utilized in machines of the ten-key type. Each of the numeral keys has a key stem 30 which forms a stop for a Vernier type slide 32 suitably mounted for reciprocation beneath the ends of the key stems 30, and provided with stop lugs 34 for cooperation with the ends of key stems 30 which have been depressed. The slides 32, one for each denominational order of the machine, are respectively connected to actuators 36 suitably mounted for sliding movement upon a pair of fixed rods 38 and 39. Each of the actuators is provided with a pair of racks 40 and 41, the racks 40 meshing with segmental pinions 42 formed on type sectors 44. These sectors carry segmental type bars 46, and are mounted for free rotation on a shaft 43. A paper web 48 is fed from a roll by suitable mechanism, passing partially around a platen 50 which, to effect a printing operation, is swung toward the type on the type bars 46, an inked ribbon 52 being provided to effect the printing impression.

The racks 41 on the actuators 36 mesh respectively with segmental gears 54. Each of the gears 54 is fixed to a hub 56, the hubs being rotatable upon a fixed sleeve 57 in which a shaft 58 is rotatable. Each of the hubs 56 has an adding sector 60 freely pivoted thereon, this sector being normally urged counterclockwise relative to its associated segmental gear 54 by a tension spring 62, one end of which is secured to the segmental gear 60 and the other end of which is secured to a projecting arm on a disc 64 which is likewise fixed to its associated hub 56.

Transfer mechanism

Each of the adding sectors 60 is normally held from counterclockwise (Fig. 1) movement under the influence of its associated spring 62 by the engagement of a hook shaped end 66 of a transfer pawl 68 with a lug 67 projecting sidewardly from the sector 60, the transfer pawl 68 being pivoted upon a fixed shaft 70 and having forwardly projecting arms 72 engaged by a transfer latch 74. The latch 74 and the transfer pawl 68 are both biased to swing clockwise by a tension spring 76 connected between them.

Each of the adding sectors 60 is provided with a segmental gear 78 which is adapted to mesh with accumulator adding pinions 80 or the subtract pinions 82 which are intermeshed with the adding pinions. Each of the pinions 80 is provided with a transfer cam 81 fixed thereto, while each of the pinions 82 has a similar transfer cam 83 fixed thereto (Fig. 2), these cams being adapted to cooperate with cam projections 84 formed on the transfer pawls 68, each of the transfer cams 81 being adapted to engage the associated cam projection 84 as the pinion 80 rotates from "9" position to "0" position, while each of the cams 83 may be positioned to engage and trip its associated transfer pawl 68 as the pinion 80 moves from "0" to "9" position. This transfer mechanism does not per se form part of the present invention, except as the parts thereof are used in conjunction with the fugitive 1 inserting mechanism, this transfer mechanism being more fully disclosed in my prior Patent No. 2,411,050.

The accumulator pinions 80 are mounted on an accumulator shaft 86, while the pinions 82 are mounted for free rotation on a similar shaft 88, these shafts forming part of an accumulator frame 90, the latter being shiftable from the position in which it is shown in Fig. 1, to the left so as to bring the pinions 82 instead of 80 into position for enmeshment with the adding sector gears 78. The accumulator frame 90 is also operated in a conventional manner at the required time in the operating cycle of the machine to swing the accumulator pinions 80 or 82 (depending upon whether adding, positive totals or subtotals, or on the other hand, whether subtract or negative total or subtotals are to be performed) into mesh with adding sector gears 78. The machine is equipped with the usual operating mechanism, either electric motor driven or hand operated, and is provided with the usual interlocks, controls, and control keys common to this type of machine, as illustrated and described in greater detail in the aforesaid Patent No. 2,411,050.

"Fugitive 1" entering mechanism

The accumulator is shifted from add to subtract position, and vice versa, by a lever 92 (Fig. 4) secured at 94 to the end of shaft 58, the depending arm of the lever 92 being provided with a fork 96 embracing a roller 98 rotatably mounted on the accumulator frame 90. A similar lever 200 (Fig. 5) also secured to shaft 58, is slotted at 204 to embrace a roller 206 mounted on the other end of the accumulator frame 90. A link 100 has one end pivotally connected to a stud 102 secured near the lower end of the lever 92, while its other end is pivotally connected to an arm 104 forming part of a bail 106, the bail being mounted for pivotal movement upon a fixed shaft 108. The bail 106 has a second arm 110 which has a sidewardly extending lug 112 (Fig. 2).

Figure 6:
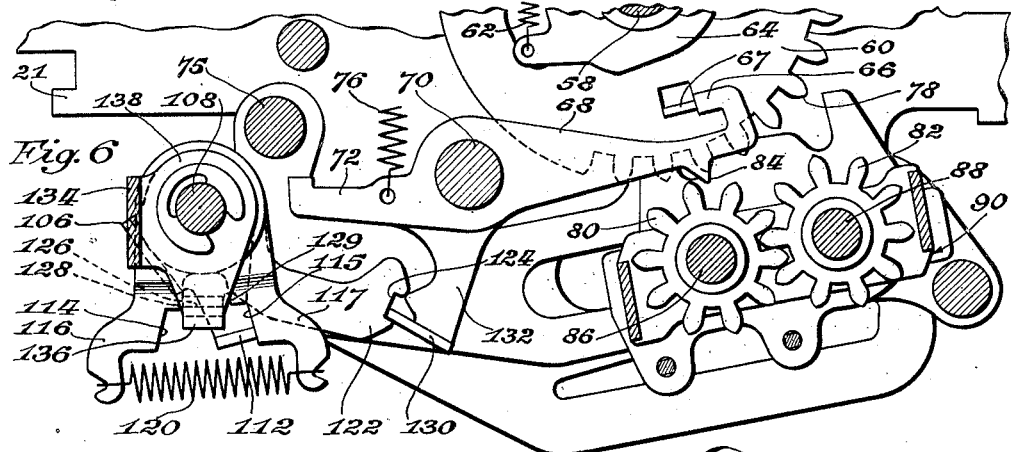
Fig. 6 is a fragmentary sectional view, taken along the line 6—6 of Fig. 3, showing the accumulators in adding position.
Figure 7:
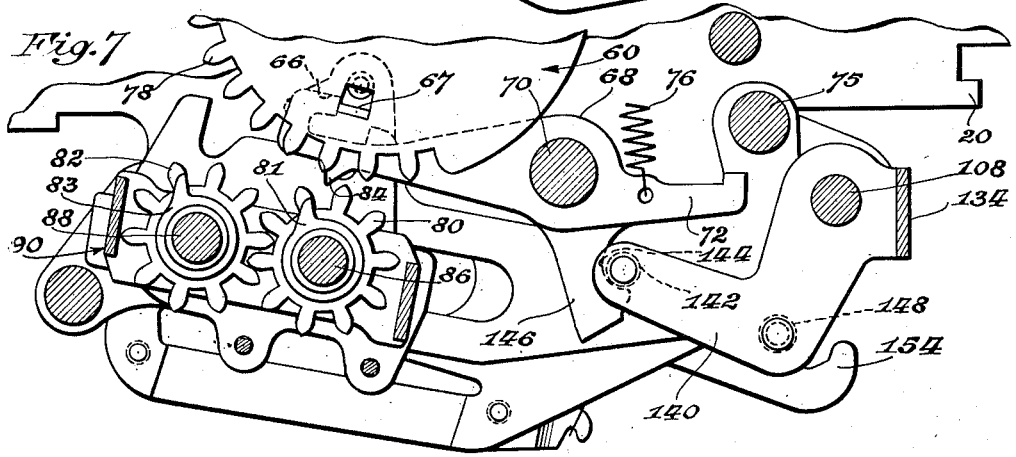
Fig. 7 is a view taken on the line 7—7 of Fig. 3, likewise showing the accumulator in adding position.
Figure 8:
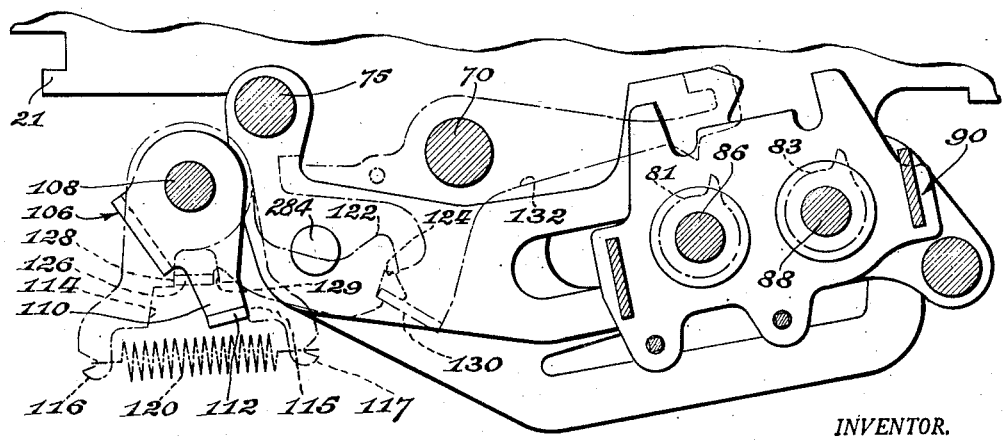
Fig. 8 is a fragmentary sectional view, taken along the line 8—8 of Fig. 3.

As best shown in Figs. 1, 6, and 8, the lug 112 projects between opposed faces 114 and 115 of arms 116 and 117, which are freely pivoted on the reduced diameter portion of a bushing 118 mounted for rotation on the shaft 108, as shown in Fig. 2a.

Figure 2:
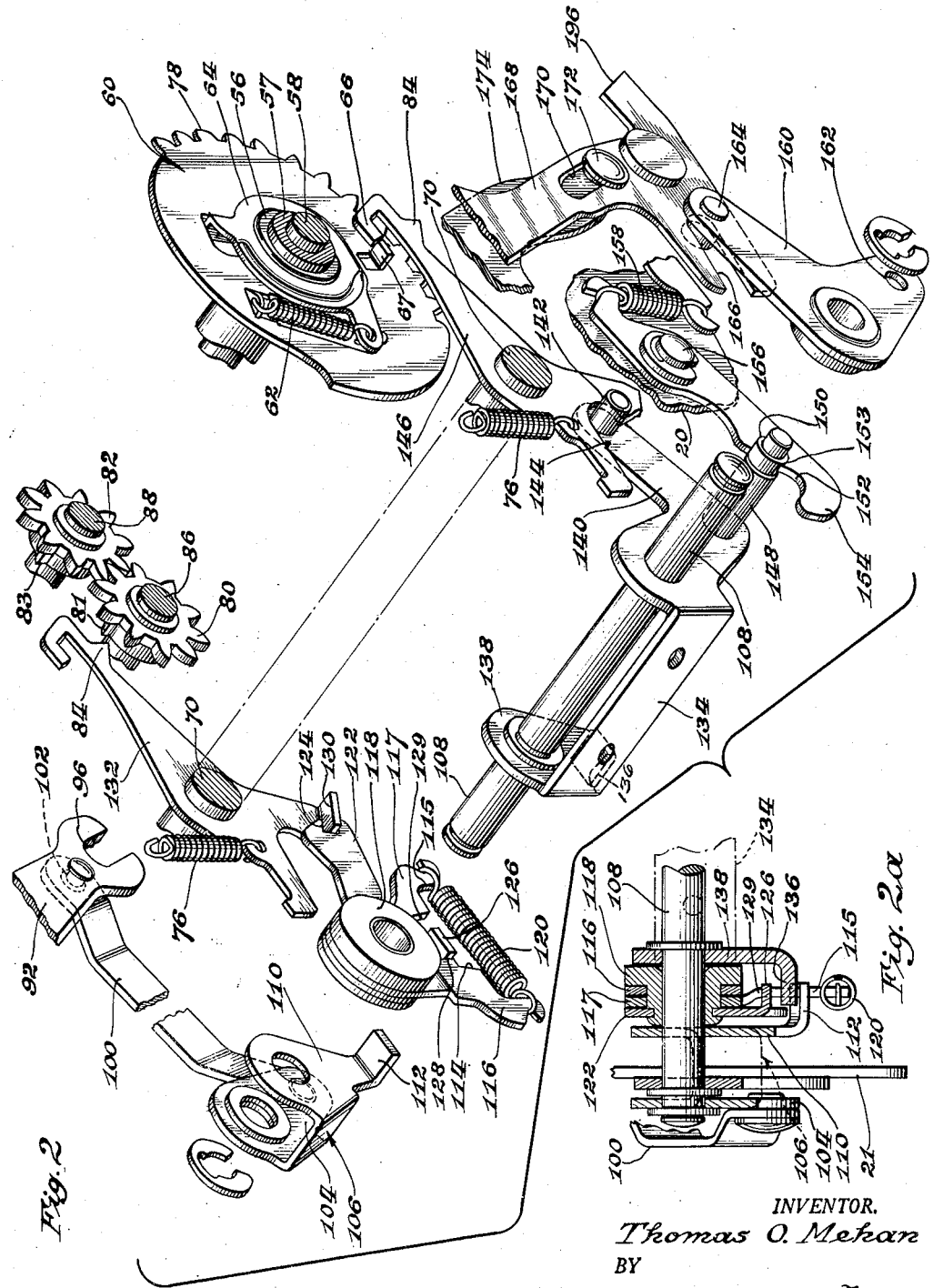
Fig. 2 is an exploded perspective view of portions of the fugitive 1 entering mechanism.

The arms 116 and 117 are urged to swing toward one another by a tension spring 120 (Fig. 2). A third arm 122 is preferably fixed to the bushing 118, the latter being rotatable upon the shaft 108, and the rearwardly extending portion of the arm 122 being provided with a notch 124. The arm 122 also has a sidewardly extending lug 126 which is positioned somewhere between the two stop faces 128 and 129 formed on the arms 116 and 117, respectively.

The notch 124 normally embraces a sidewardly extending lug 130 on a depending arm of a transfer pawl 132 associated with and adapted to be operated by the cams 81 or 83 of the highest denominational order accumulator pinions. The transfer pawl 132 is normally urged to swing clockwise, as are the transfer pawls 68, by a suitably anchored tension spring 76.

A bail 134 is suitably mounted for rotation on the shaft 108, and has a sidewardly extending lug 136 on its lefthand arm 138, the lug 136 projecting into the space between the stop faces 114 and 115 of the arms 116 and 117. The righthand arm 140 of the bail 134 extends rearwardly and carries a stud 142 which is normally positioned in a notch 144 formed in the transfer pawl 146 associated with the adding sector 60 which operates the units order accumulator pinions, this pawl 146 being likewise biased for a clockwise movement by a spring 76. The rearwardly extending arm 140 of the bail 134 also has a sidewardly extending stud 148 carrying a roller 150 which is adapted to rest in either one of two adjacent notches 152 and 153 formed in a detent arm 154. The arm 154 is pivoted on a suitably fixed stud 156 and is urged clockwise (Fig. 2) by a suitably anchored tension spring 158, and thus forms a detent yieldable to hold the bail 134 and connected parts in either of their extreme positions.

A bellcrank arm 160 fits over the shaft 108 and has an opening 162 for the reception of the reduced diameter end portion of stud 148 so that in effect the bellcrank 160 forms a part of the bail 134 and moves therewith. The rearwardly extending arm of the bellcrank 160 is provided with a sidewardly projecting stud 164 which is normally positioned in an open end slot 166 formed in the forwardly extending portion of a slide 168.

The slide 168 (Fig. 5) has a pair of elongated slots 170, 171, through which project studs 172 and 173, secured to an arm 174. The slide 168 has a sidewardly extending stud 176 which, when the slide is in a lowered position, is adapted to abut a sidewardly extending lug 178 forming part of a freely pivoted arm 180.

The slide 168 has a second stud 182 which projects into an elbow shaped slot 184 forming part of a signal type carrier 186. This type carrier is mounted for rotation upon the shaft 43 upon which the numeral type carriers and other signal carriers are mounted. The type carrier 186 carries a segmental type bar 188 having a projecting face 190 to print the character "C" to indicate, when a negative totaling or subtotaling operation is performed, that such total or subtotal is of a negative or overdraft character.

The lever 174 is pivoted on a fixed stud 192 and is adapted to be swung counterclockwise (Fig. 5) whenever the total key 194 is swung forwardly from its normal position to effect the taking of a subtotal operation, or rearwardly from the normal position to effect a total taking operation. The connection between the stem of the total and subtotal key 194 and the lever 174 may be of any suitable type, such as shown, for example, in said prior Patent No. 2,411,050.

Figure 5:
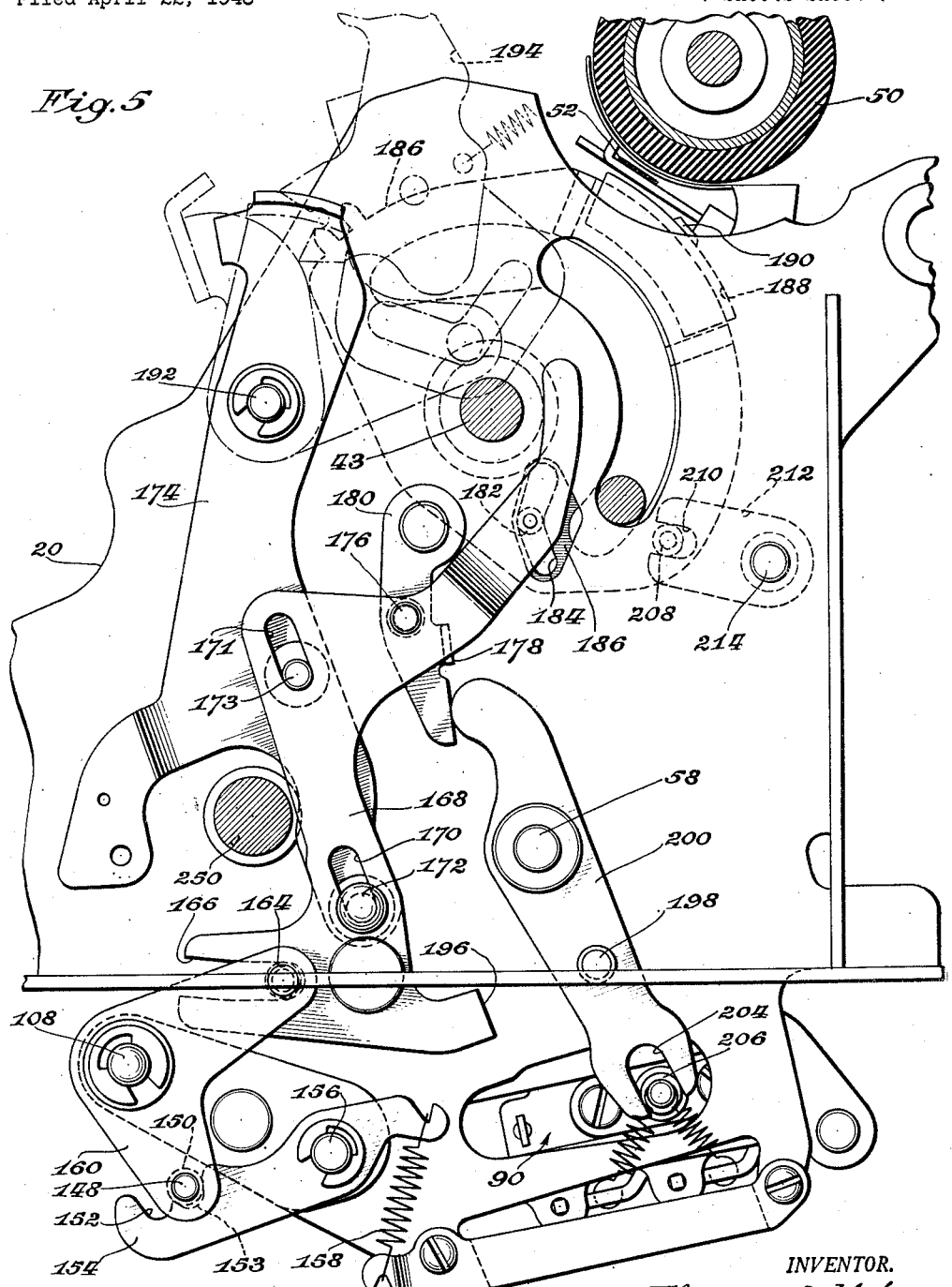
Fig. 5 is a right side elevation of portions of the mechanism, taken along the line 5—5 of Fig. 3.

When the lever 174 is thus swung counterclockwise from the position shown in Fig. 5, a rearwardly projecting portion 196 of the slide 168 may engage a stud 198 projecting sidewardly from an auxiliary accumulator shift lever 200 pivoted on a rocking shaft 58. Such counterclockwise swinging of the lever 174 takes place without disengaging the stud 164 from the open end slot 166. Fig. 5 shows the parts in normal position during an adding operation. When the total and subtotal key is shifted in either direction to take a subtotal or total, the projection 196 at the lower end of the slide 168 engages the stud 198 and moves the lever 200 counterclockwise. The lower end of the lever 200 is provided with a notch 204 which embraces a roller 206 mounted on the accumulator frame 90. Levers 200 and 92, being fixed to the shaft 58, swing together and thus shift the accumulator frame 90 smoothly. Thus, if the accumulator frame 90 is not in position to have its adding pinions 80 engage the adding sector gear 78, it will be shifted to such adding position by the engagement of the projection 196 with the stud 198, and the consequent counterclockwise swinging movement of the levers 92 and 200.

On the other hand, as will appear more fully hereinafter, when the accumulator contains a negative total, the bellcrank 160 will have been swung clockwise from the position in which it is shown in Fig. 5, and thus move the slide 168 downwardly a distance corresponding to the length of the slots 170 and 171. Such downward movement of the slide 168 will bring its stud 176 into position for engagement with the lug 178 on the arm 180. Therefore, when the arm 174 is swung counterclockwise by shifting the total and subtotal key 194 to either of its extreme positions, the stud 176 will engage the lug 178 and the lower end of the arm 180 will engage the upwardly extending arm of the auxiliary accumulator shift lever 200 and swing the latter clockwise, thereby shifting the accumulator 90 to bring the subtract pinions 82 into position for meshing engagement with the segmental gears 78. Such downward movement of the slide 168 also brings its rearward projection 196 below the stud 198 so that there is no interference with the clockwise swinging movement of the lever 200.

When the slide 168 moves downwardly (in the direction of slots 170, 171), which occurs when the accumulator contains a negative balance, the stud 182 fixed to the slide 168 rides downwardly into the lower end of the elbow shaped slot 184, and thus is in position to move the type carrier 186 counterclockwise to bring the type 190 into printing position beneath the ribbon 52 whenever the total key is operated to swing lever 174 counterclockwise. It will be understood that when the slide 168 is in its normal upper position, as shown in Fig. 5, and the arm 174 is swung counterclockwise, the stud 182 moves upwardly in the upper portion of the elbow shaped slot 184, and since this movement is about the pivot stud 192, such movement of the stud 182 does not change the position of the type carrier 186.

Figure 4:
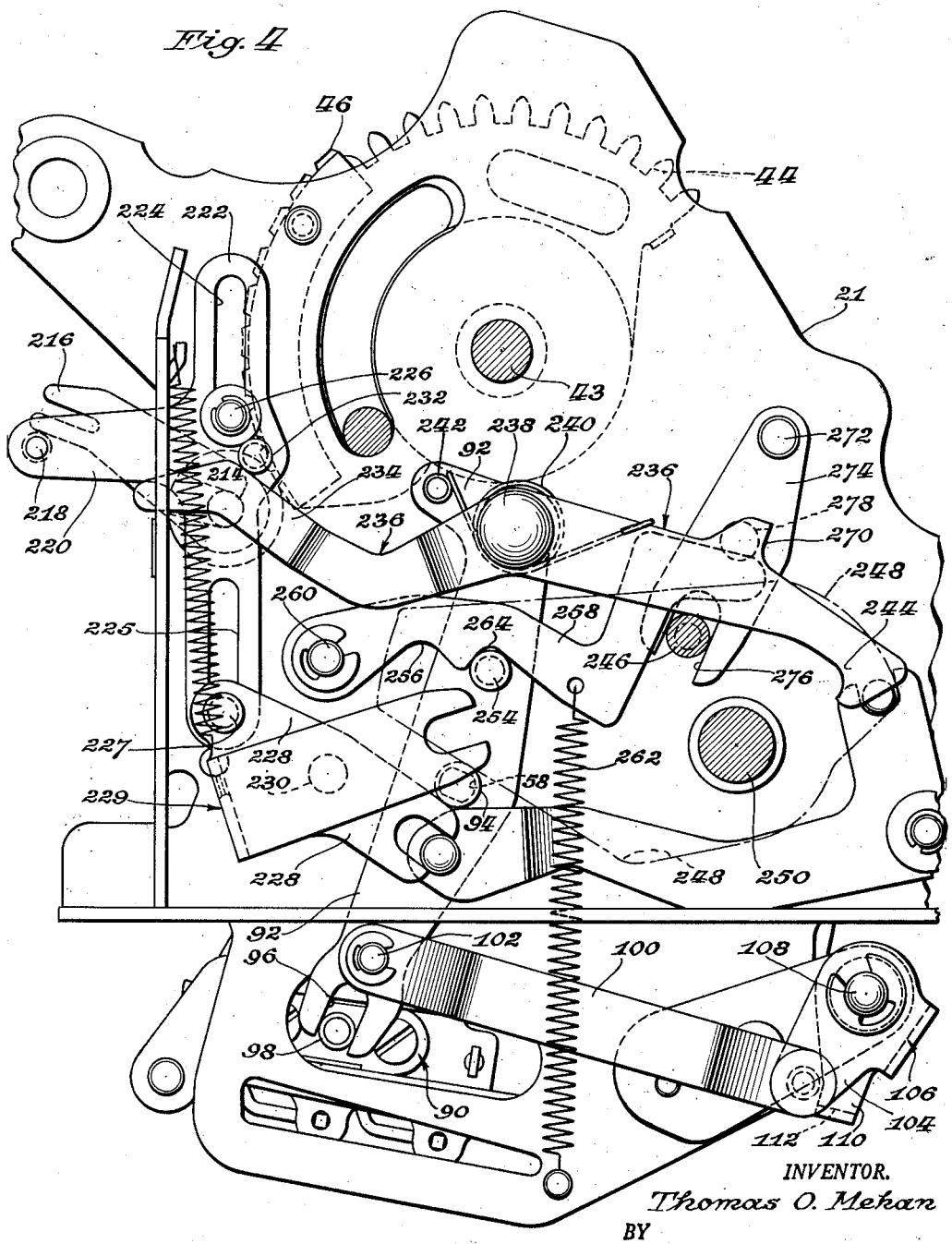
Fig. 4 is a left side elevational view of the rearward portion of the machine with the casing removed, the view being on the line 4—4 of Fig. 3.

The type carrier 186 has a sidewardly extending stud 208 (Fig. 5) which projects into an open end slot 210 formed at the end of an arm 212, fixed to a suitably pivoted shaft 214. The shaft 214 extends transversely of the center section of the machine, as shown in Figs. 3 and 10. The left-hand end (Fig. 3) of shaft 214 has an arm 216 fixed thereto (Fig. 4). The arm 216 overlies a sidewardly extending stud 218 formed on a rearwardly projecting arm 220 of a slide 222. The rearward end of the arm 216 is provided with an open end slot which, by spreading or narrowing the slot with suitable tools, allows for adjustment of the contact of this arm with the stud 218. Thus the slide 222 is moved downwardly whenever the amount in the accumulator is negative, this being accomplished through the previously described kinematic train comprising parts 134, 148, 160, 164, 168, 182, 186, 208, 212, 214, 216, 218, and 220.

The slide 222 is provided with elongated slots 224 and 225 which embrace a fixed stud 226 and a stud 227, respectively. The stud 227 is secured to one arm 228 of a bail 229. The bail 229 is pivoted by means of a stud 230 which extends through the arm 228 of this bail.

The slide 222 has a sidewardly projecting stud 232 which overlies the rearwardly extending arm 234 of a lever 236 pivoted upon a stud 238 carried at the upper end of lever 92. The lever 236 is normally biased to move clockwise (Fig. 4) by a torsion spring 240 which is wound around the stud 238 and has one end anchored against a stud 242 fixed to the accumulator shifting lever 92.

The forwardly projecting arm of the lever 236 is provided with a hook portion 244 which in normal adding operations is adapted to be engaged by a stud 246 secured to a cam plate 248 fixed to the main shaft 250. It will thus be apparent that when the lever 236 is swung counterclockwise by downward movement of the slide 222 (as occurs when the amount in the accumulator is negative), the hook portion 244 will be raised above or outwardly of the arcuate path of movement of the stud 246 and will thus not be engaged thereby, and the accumulator frame 90 will therefore not be returned to add position, but instead will remain in the subtract position, the accumulator being held in the subtract position by engagement of a stud 254, secured to the accumulator shift lever 92, in a notch 256 formed in a detent arm 258 pivoted on a stud 260 and biased to swing clockwise (Fig. 4) by a tension spring 262.

When the accumulator frame 90 is shifted to add position (in which it is shown in Fig. 4), it is held in such position by the engagement of the stud 254 in a notch 264 formed in the lower edge of the detent arm 258.

The upper edge of the forwardly projecting portion of lever 236 (Fig. 4) is provided with a notch 270, which during a subtract operation is engaged by a stud 272 which is carried by a lever 274. The lower end of the lever 274 is provided with an open end slot 276 which embraces a stud 246. The lever 274 is pivoted on a stud 278, and, as is more fully disclosed in the aforesaid Patent No. 2,411,050, operates, through the lever 236, to slide the accumulator frame 90 forwardly to its subtract position.

*Operation*

Assume that the accumulator contains a positive entry such, for example, as the positive amount "1," and the operator depresses the amount key for "2," and conditions the machine for subtraction. Under these circumstances, the accumulator frame 90 will be shifted forwardly from the position in which it is shown in Figs. 1 and 4 by means of the customary controls, to bring the accumulator pinions 82 into position for meshing engagement with the adding segment gears 78. Upon operation of the machine to subtract the amount 2 from the amount 1, the accumulator pinion 82 will be rotated clockwise (Fig. 1, and the meshing accumulator pinions 80 rotated counterclockwise) to subtract the amount 2. In the course of this operation, as the units accumulator pinion 82 moves from the "0" position to the "9" position, it will trip its transfer pawl 68 to cause the tens pinion 82 also to move from the "0" to the "9" position, thereby tripping the tens transfer pawl 68. Such successive tripping operations for the hundreds, thousands, ten thousands, etc., will take place rapidly until the accumulator pinion 82 for the highest denominational order rotates from "0" to "9" position, whereupon its transfer cam 83 will engage the cam projection 84 of the transfer pawl 132 to swing the latter counterclockwise (Fig. 2). In so doing, the lug 130 thereof will be disengaged from the notch 124.

It will be recalled that when the machine is conditioned for subtraction and the accumulator frame 90 is moved forwardly, the accumulator shift arm 92, by virtue of its connection with the bail 106 through link 100 (Fig. 2) will swing this bail clockwise on its shaft 108 to move the lug 112 to the left (Figs. 1 and 6), and thereby move the arm 116 clockwise. In so doing, the lug 112 leaves the face 115 of the arm 117 and engages the face 114 of the arm 116 to swing the latter clockwise to further tension the spring 120, since the arm 117 is prevented from swinging clockwise by the lug 126 as long as the lug 130 is in the notch 124.

As will appear hereinafter, the energy thus stored up in the spring 120 is used to effect the rapid entry of the fugitive 1.

Upon disengagement of the lug 130 from the notch 124 in the arm 122, due to the fact that the face 129 of the arm 117 presses against the lug 126, the arm 122 will be swung clockwise and the clockwise movement of the lug 126 will permit the arm 117 to swing clockwise along with the lug 126, and such clockwise swinging movement of the arm 117, due to its engagement with the lug 136 on bail 134, will also swing the latter clockwise. The clockwise movement of the bail 134 will raise the hook portion 66 of the transfer pawl 146 above the lug 67 of the adding segment 60 associated with the units order, the stud 142 moving out of the notch 144. When this occurs, the spring 62 will swing the adding segment 60 counterclockwise until the lug 67 bottoms in the hook portion 66 of the transfer pawl. Since the accumulator pinions 82 are in mesh with the segmental gear of the adding segments 60 at this time, the accumulator will have a unit entered therein.

At the conclusion of each cycle of operation, the transfer pawls 68, 132, and 146 are returned to and latched in normal position by the usual transfer mechanism restoring bail which includes a cross-rod 75 (Fig. 1).

The rod 75 is carried by the accumulator frame 90 which rocks on a pair of studs 284, 285 (Figs. 3 and 9) to move the accumulator pinions 80 or 82 into and out of mesh with the segmental gears 78. Thus when the accumulator pinions are swung out of mesh, the rod 75 engages the latches 74 of any of the carrier pawls 132, 146 which have been tripped, and restores them to latching position as shown in Fig. 1. This mechanism is more fully disclosed in my prior Patent No. 2,411,050.

At the beginning of each operating cycle, a rod 288 (Fig. 1) is rotated counterclockwise through a sufficient angle to cause a plate 289 secured thereto to engage the adjacent last tooth of each of the segmental gears which in the preceding cycle has been moved counterclockwise beyond its normal position in effecting a transfer. Such segmental gears are moved clockwise by the plate 289 to disengage the hook portions 66 of their transfer pawls 68 from lugs 67 on their associated segmental gears 60, and thereby permit their associated transfer pawls to be returned to their normal positions by their springs 76. The mechanism for rocking the rod 288 is likewise more fully disclosed in my said prior Patent No. 2,411,050.

If, while the accumulator contains a negative total or credit balance, a total or subtotal operation is performed, it will be understood that due to the shifting of the position of the bellcrank lever 160, the slide 168 will be moved to its lower position and its stud 176 will lie in front of the lug 178. Thus the swinging movement (counterclockwise) of lever 174, upon operation of the total key 194, will cause the arm 180 to swing counterclockwise and swing the accumulator shift lever 200 clockwise to move the accumulator frame 90 forwardly and thereby bring the subtract pinions 82 into position for engagement with the adding gear segments 78. The downward movement of the slide 168 will also cause (through engagement of the roller 182 with the slot 184) the type carrier 186 to move counterclockwise to bring the "C" type 190 into printing position. By this means the correct negative total will be printed with the signal showing that the total was negative, this is, a credit balance or overdraft.

If the accumulator contains a negative total and an amount is added so as to cause the sum added into the accumulator to be positive, the units accumulator pinion 80, in moving from "9" to "0" position will cause a transfer to be effected into the tens order, and since at or about this time the tens and all higher order accumulator pinions will be in "9" position, the transfer will be carried successively to the higher order accumulator pinions until the highest order accumulator pinion is moved from "9" to "0," whereupon the transfer pawl 132 associated with such highest order pinion will be tripped. Under these circumstances, the accumulator shift arm 92 will have been shifted rearwardly to shift the accumulator to "add" position, so that the bail 106 carrying lug 112 will be swung counterclockwise.

The lug 112 will therefore move the arm 117 counterclockwise (Fig. 6) and thereby apply additional tension to the spring 120. The arm 116 will temporarily be held stationary until, as above described, the transfer pawl 132 is tripped, whereupon the arm 122 will be swung counterclockwise by the spring 120 acting through the arm 116 and the lug 126. Such counterclockwise swinging movement of the arm 116 also causes the bail 134 to be swung counterclockwise due to the engagement of the face 114 of arm 116 with the lug 136 which forms part of the bail 134. The stud 148, with its roller 150, will therefore shift from notch 152 to the notch 153 in the spring actuated detent arm 154, and the transfer pawl 146 will therefore again be tripped to add the fugitive 1 into the adding accumulator comprising the pinions 80. The bellcrank arm 160 will also be swung counterclockwise to raise the slide 168 to normal adding position so that the projection 196 at the lower end of the slide will be in position to engage the stud 198. The machine will then be in a condition to print a positive total.

If during any adding or subtracting operation, the capacity of the accumulator is exceeded, the fugitive 1 inserting mechanism will not operate effectively. This is because during adding operations the arm 140 is already in its farthest clockwise position and the spring 120, although moving arm 122, cannot move arm 140 farther. Similarly during subtracting operations, when the negative capacity of the machine is exceeded, the arm 140 will already have been moved to its farthest counterclockwise position, and hence the spring 120 cannot move it farther and the tripping of pawl 132 can have no effect.

It will be clear that at the completion of each operation the accumulator is in condition for the taking of a correct positive or negative total without the necessity of taking any blank strokes. This is because the total taking mechanism is immediately conditioned for taking a positive or a negative total as soon as the fugitive 1 has been inserted. The power for the operation of the fugitive 1 inserting mechanism is derived from the energy stored up in spring 120, so that this mechanism may operate at any time, and it is held in the required position by the detent 154.

The fact that no blank stroke is required prior to the taking of either a positive or negative total or subtotal, is advantageous because of the greater simplicity and speed with which the machine may be operated.

While I have shown and described a preferred embodiment of my invention, it will be apparent that numerous variations and modifications thereof may be made without departing from the underlying principles of the invention. I therefore desire, by the following claims, to include within the scope of the invention all such variations and modifications by which substantially the results of my invention may be obtained through the use of substantially the same or equivalent means.

I claim:

1. In an adding machine capable of performing subtracting operations and which has differentially movable actuators, the combination of an accumulator comprising a pair of parallel shafts, a plurality of similar pinions mounted for independent rotation on said shafts, the pinions on one shaft respectively meshing with those on the other shaft, a frame carrying said shafts, said frame being movable to bring the pinions on either shaft into meshing engagement with the actuators, a transfer cam on each of the pinions, transfer mechanisms associated with all except the highest denominational order pinions to effect transfers to the next higher order pinions, and means to effect a transfer from the highest order pinions to the lowest order pinions comprising: a pair of pivoted levers, a relatively strong spring tensioned between corresponding ends of the levers, a single latch normally holding the levers from movement by the tensioned spring, said latch being positioned to be tripped by being engaged by the transfer cam on either of the highest order pinions, depending upon which pinion is in mesh with its actuator, the latch being tripped when one of the highest order pinions moves from zero to nine position or when the other highest order pinion moves from nine to zero position, an element moved by the tensioned spring in one direction through one of the levers when the latch is tripped, a detent arm to hold the element in either of its extreme positions, means operated by said element to effect the addition of the fugitive 1 in the lowest order pinions when the said highest order pinion moves from zero to nine and to subtract the fugitive 1 in the lowest order pinions when said highest order pinion moves from nine to zero, said last named means operating immediately upon the aforesaid movement of the highest order pinions, and means to reset said levers and latch.

2. In a calculating machine of the type equipped for direct subtraction and having amount determining differential actuators, the combination of an accumulator comprising a pair of intermeshing pinions for each denominational order, means for selectively shifting one set of pinions into position for engagement with the actuators depending upon whether the operation to be performed is adding, taking a positive total, or subtracting, taking a negative total, transfer means operable to effect carrying operations from each order to the next higher order, and means to effect the entry of the fugitive 1 in the units order pinions comprising: transfer cams respectively connected to the highest order pinions, a pair of pivoted arms, a spring biased to swing said arms in opposite directions, means operated by the accumulator shifting means to tension the spring by swinging one of the arms away from the other, a latch positioned to be tripped by one of said transfer cams and normally holding said other arm against movement by said spring, an element engaged by said arms and arranged to be moved by the spring whenever the latch is tripped, means operated by said element immediately to effect the addition of a unit in the lowest denominational order pinion whenever said latch is tripped, and means operable during each machine cycle to reset said latch, arms, and element to their normal positions.

3. In a calculating machine having an accumulator comprising a plurality of pairs of intermeshing pinions, a transfer mechanism, toothed actuators, and means for shifting the accumulators into and out of mesh with the actuators; the combination of cams on the highest denominational order of pinions, a pair of pivoted arms, resilient means biased to swing said arms in opposite directions, a latch cooperating with one of said arms to hold it against movement by said resilient means, said latch being positioned for tripping by one of said cams when its associated pinion is in engagement with its actuator, thereby to release its cooperating arm for actuation by the resilient means, mechanism operated by the arm immediately upon its release by the latch to effect the entry of 1 in the lowest order pinion which is at that time in mesh with its actuator, and means to reset the arm and its associated latch.

4. The combination set forth in claim 3 in which an operational control key is provided which when in one position conditions the machine for a subtracting operation, a negative balance indicating part, means operated by the control key when moved to subtract position partially to precondition said part for effective operation, and means operated by the one of said arms which is normally held by the latch to completely condition said part for effective operation.

5. The combination set forth in claim 3 in which a resilient detent is provided to hold the one of said arms which is normally held by the latch in actuated position, and in which means are operated near the completion of an operating cycle of the machine to restore the latch and the arm associated therewith to their normal positions against the force applied by the resilient detent.

THOMAS O. MEHAN.

REFERENCES CITED

The following references are of record in the file of this patent:

UNITED STATES PATENTS

| Number | Name | Date |
|---|---|---|
| Re. 22,986 | Fettig | Mar. 16, 1948 |
| 1,810,213 | Johantgen | June 16, 1931 |
| 2,014,560 | Dysart | Sept. 17, 1935 |
| 2,160,296 | Sundstrand | May 30, 1939 |
| 2,371,914 | Rauh | Mar. 20, 1945 |